Dec. 18, 1934.  N. E. METHLIN  1,985,185
REMOTE CONTROLLED DEVICE FOR INSERTING AND
EXTRACTING PRIMERS FOR LARGE BORE GUNS
Filed Dec. 13, 1933    8 Sheets-Sheet 3

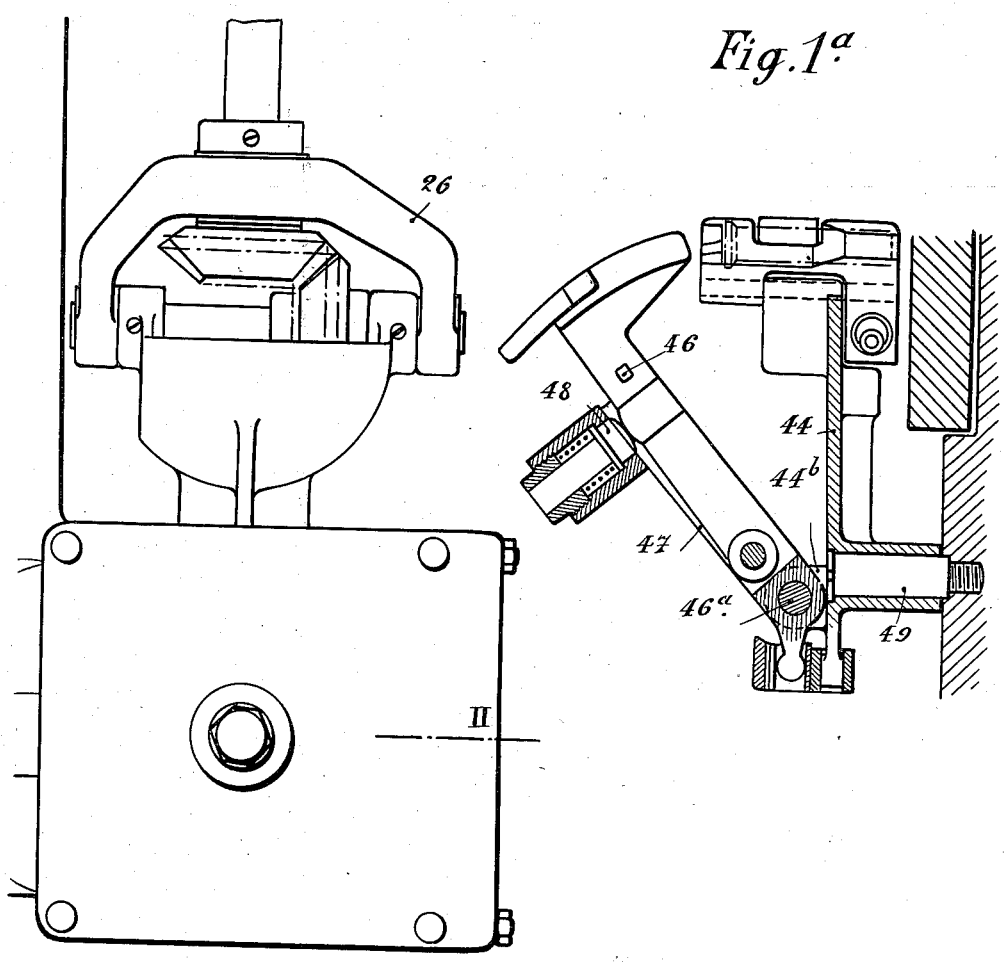
Fig.1ᵃ

Inventor
Nicolas Emilien Methlin.
By Cameron, Kerkam & Sutton.
Attorneys.

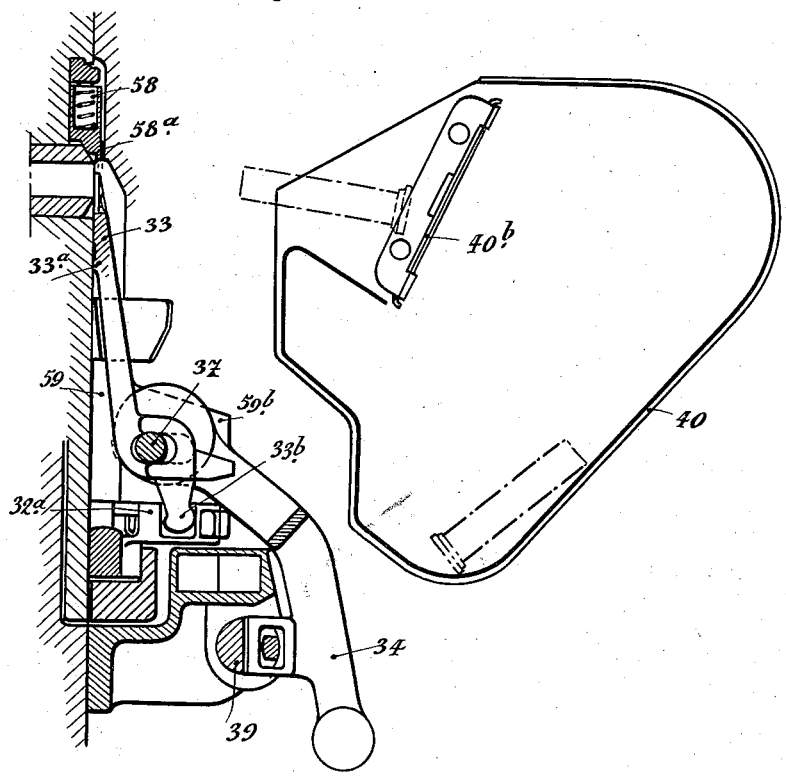
Fig. 4.
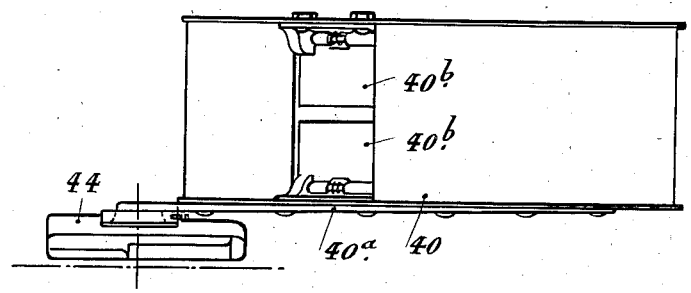
Fig. 4ᵃ

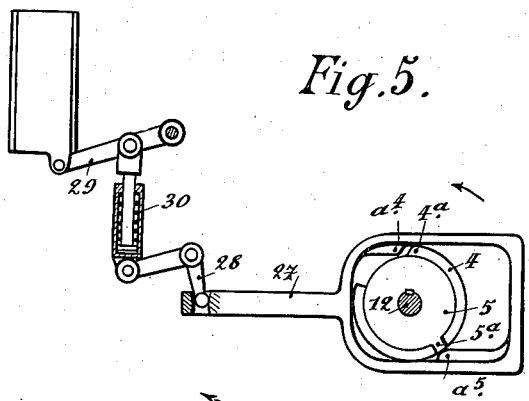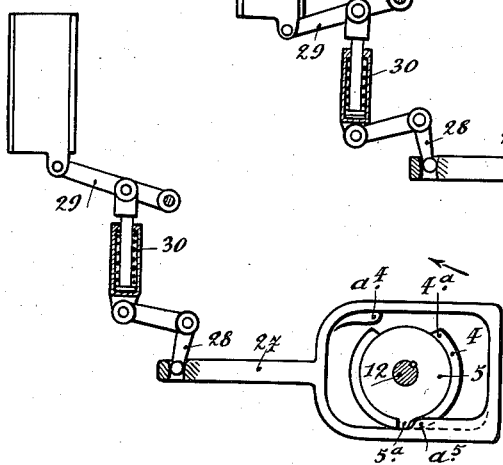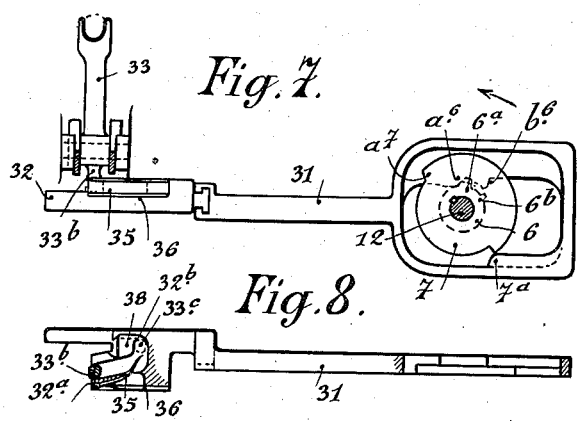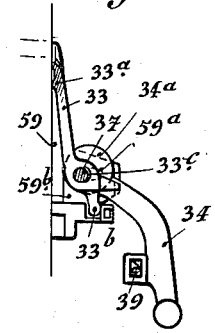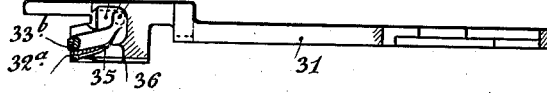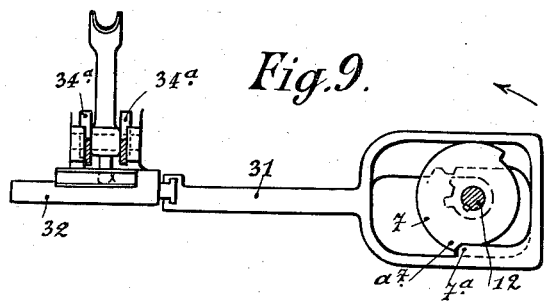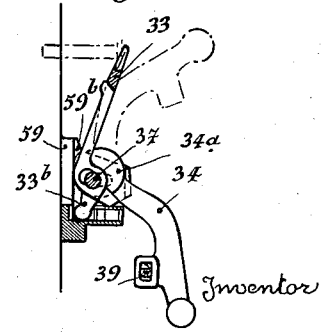

Dec. 18, 1934.   N. E. METHLIN   1,985,185
REMOTE CONTROLLED DEVICE FOR INSERTING AND
EXTRACTING PRIMERS FOR LARGE BORE GUNS
Filed Dec. 13, 1933   8 Sheets-Sheet 7
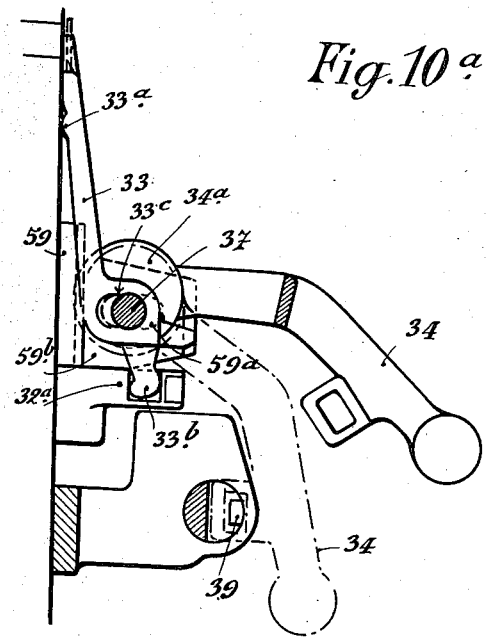
Fig. 10ª
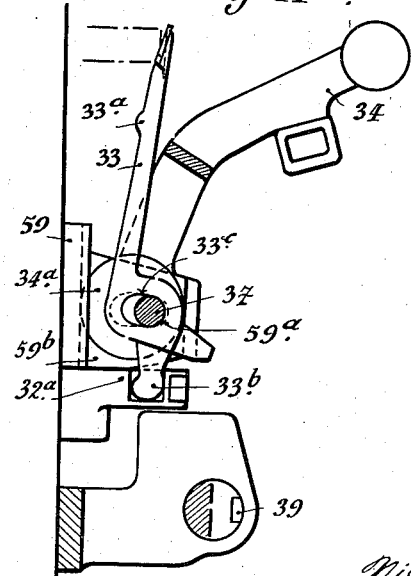
Fig. 11ª
Inventor
Nicolas Emilien Methlin
By Cameron, Kerkam & Sutton.
Attorneys.

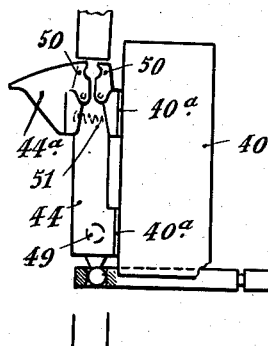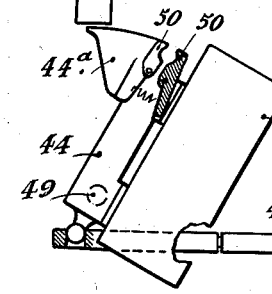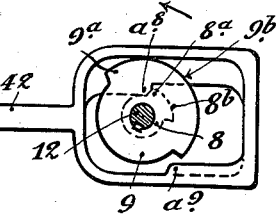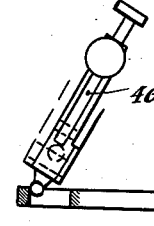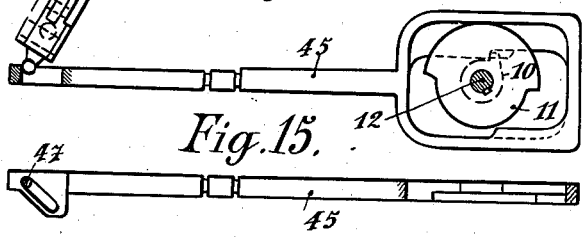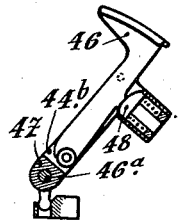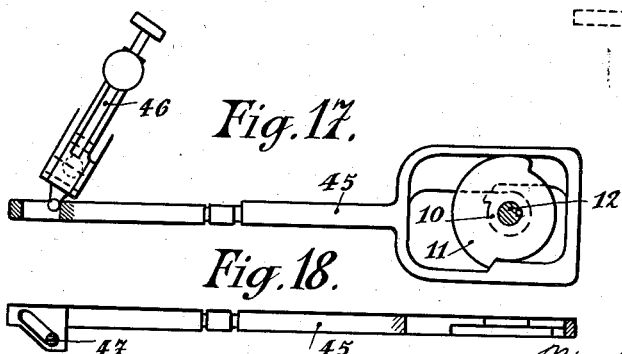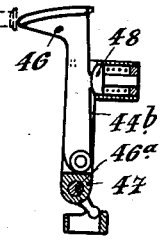

Patented Dec. 18, 1934

1,985,185

UNITED STATES PATENT OFFICE 1,985,185

REMOTE CONTROLLED DEVICE FOR INSERTING AND EXTRACTING PRIMERS FOR LARGE BORE GUNS

Nicolas Emilien Methlin, Paris, France, assignor to Schneider & Cie, Paris, France, a limited joint-stock company of France Application December 13, 1933, Serial No. 702,253
In France January 27, 1933

11 Claims. (Cl. 89—27)

The French Letters Patent No. 715,398 and the British Letters Patent No. 372,984 describe a device for inserting and extracting primers by means of a mechanism independent of the movements of opening and closing the breech, the said device comprising for this purpose a flexible or telescopic transmission originating from a point independent of the breech block and its carrier and leading to a mechanism carried by the said breech block carrier. The said mechanism comprises a series of cams, the successive operation of which bring into action corresponding lever mechanisms, producing the disengagement of the firing bolt, the extraction of the fired primer, the conveyance of a new primer in order to place it in the axis of the firing duct, followed by driving the primer in this duct, means being provided for the consecutive return of the mechanisms actuated by the various cams into their initial positions, the device for conveying the primers receiving automatically, as a result of this return movement, a new primer.

The present invention relates to a particular constructional form of the mechanism comprising the elements referred to in the foregoing. In this constructional form, a simplification of the whole of the mechanism is provided by the fact that the members, the successive operation of which brings into action the various lever mechanisms for the operations enumerated, are so constituted as to ensure, in the movement which is imparted to them by the actuating mechanism, the accomplishment of the various functions necessary for the insertion, extraction and conveyance of a primer, and so forth, and also the consecutive return of the same members to their initial position, thereby dispensing with the use of return springs.

Various other modifications or improvements in detail which the new invention comprises will be described hereinafter with reference to the accompanying drawings, in which:

Figure 1 is an end elevation of a gun, showing in the closed position of the breech, the elements of the breech (breech block carrier and movable head) carrying the various devices for the disengagement of the firing bolt, the extraction of the primer, the conveyance of the new primer, and the insertion of the latter, as well as the primer magazine and that portion of the transmission originating from a point independent of the breech block and its carrier to which the present invention relates.

Figure 4 is a part sectional elevation showing the extractor combined with a box for ejected primers according to the present invention.

Figure 4a is a view in plan of the box for ejected primers fitted to the primer conveying member.

Figures 5 and 6 show diagrammatically, in two operative positions, the device for disengaging the firing bolt.

Figures 7 to 11 show diagrammatically the primer extracting mechanism. Figures 7, 8 and 10 show the said mechanism in longitudinal elevation, plan and side elevation, respectively, the members being shown in the position which they occupy before extraction, while Figures 9 and 11 show the same members in the position which they occupy at the completion of automatic extraction.

Figure 8a is a part horizontal section showing in detail, inter alia, the inclined plane on which the extractor tail bears during the extraction movement.

Figures 10a and 11a show diagrammatically the members in two different positions when extraction is effected by hand with the aid of one of the supplementary devices, to which the present invention relates.

Figures 12 and 13 show diagrammatically the primer conveying device in two different operative positions.

Figures 14 to 19 show diagrammatically the mechanism for inserting the primer into the firing duct. Figures 14, 15 and 16 show the initial position in longitudinal elevation, horizontal section and sectional side elevation, respectively, while Figures 17, 18 and 19 are corresponding views showing the members in the position which they occupy when the primer has been inserted.

Figure 1:
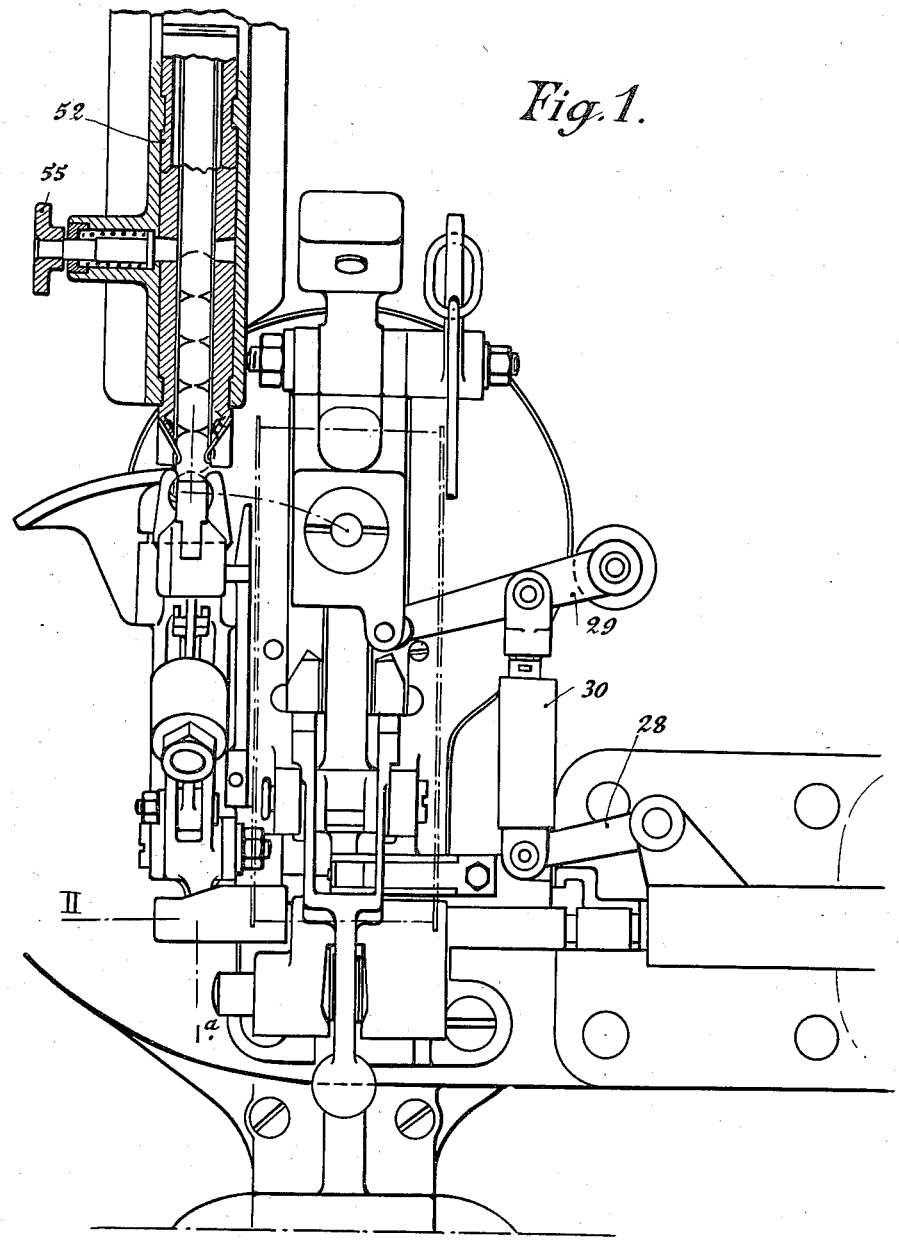
Figure 1a is a part sectional elevation taken along the line 1a—1a in Figure 1.
Figure 2:
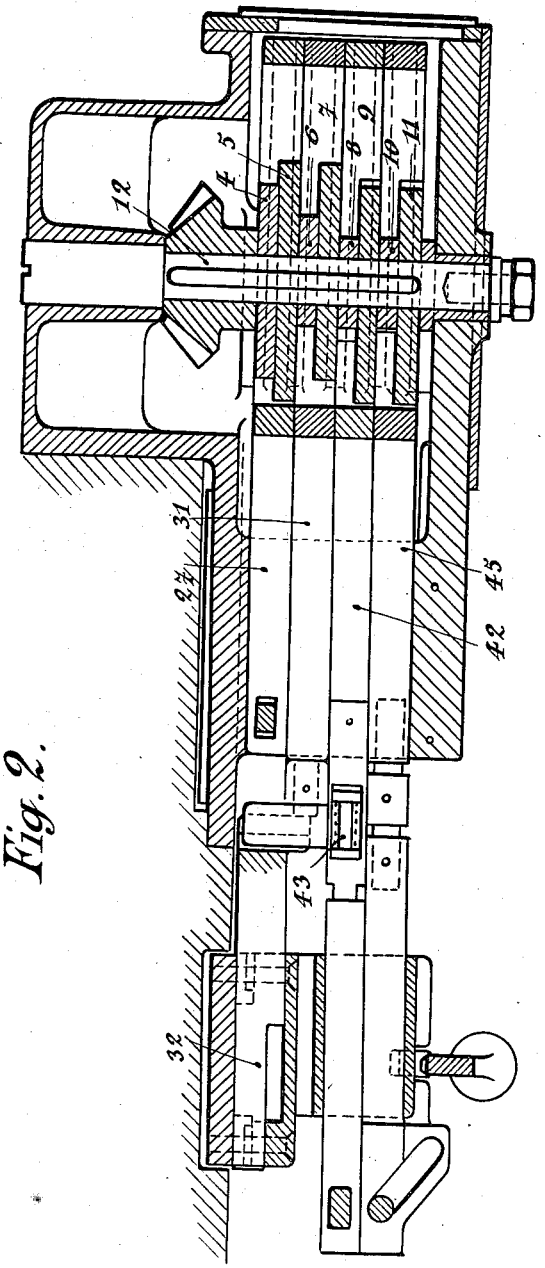
Figure 2 is a horizontal section taken along the line II—II in Figure 1.

The telescopic or flexible transmission, operated manually by means of a member mounted on the cradle, leads to a common shaft 12 carrying keyed on it the various members which, during the rotation of the controlling handwheel, ensure the successive operation of the lever mechanisms producing the disengagement of the firing bolt, the extraction of the fired primer, the conveyance of a new primer in order to place it in the axis of the firing duct, followed by driving the primer in the said duct.

The constructional form according to the present invention is essentially characterized by the fact that the various members carried by the shaft 12, in the form of suitably profiled discs 4—5, 6—7, 8—9, 10—11 each act by one of their profiles (4, 6, 8, 10) on one of the two profiles of a corresponding member carried by the actuating push rod intended to accomplish one of the functions, enumerated in the foregoing, of the entire transmission, the said discs acting by their second profile (5, 7, 9, 11) on the second profile of the corresponding member carried by the movement transmitting rod. It will be appreciated at once that both the forward and return movement of the push rods is thus obtained without the use of springs.

The discs with two profiles act successively as pushing members for the forward movement, then as pulling members for the return movement, upon the associated member possessing two corresponding profiles and constituting a push rod on the forward movement, while being driven on the return movement.

The firing bolt raising and lowering mechanism, which is shown in two operative positions in Figures 5 and 6, comprises, as stated in the foregoing, a disc with two profiles 4, 5, keyed to the shaft 12 and co-operating with a push member which is driven on the return movement. As shown by the figures, this member may be constructed in the form of a frame carried on one end of a push rod 27 and one of its arms comprises a boss $a^4$ co-operating with one of the profiles 4 of the disc 4—5, while its other arm carries a boss $a^5$ co-operating with a nose $5^a$ on the profile 5 of the same disc.

The push rod 27, during the rotation of the breech, drives the firing bolt by means of a connecting rod or by levers 28 and 29, between which is disposed a resilient connecting rod 30, thereby ensuring the usual safety of firing as long as the breech is not completely closed.

On each revolution of the shaft 12, the rod 27 makes a forward and return movement, the forward movement being determined by the action of the profile $4^a$ on the boss $a^4$, while the return movement is ensured by the frame being driven by the nose $5^a$ acting upon the profile $a^5$. Of course, the return is facilitated by the action of the spring of the resilient connecting rod 30.

Figure 3:
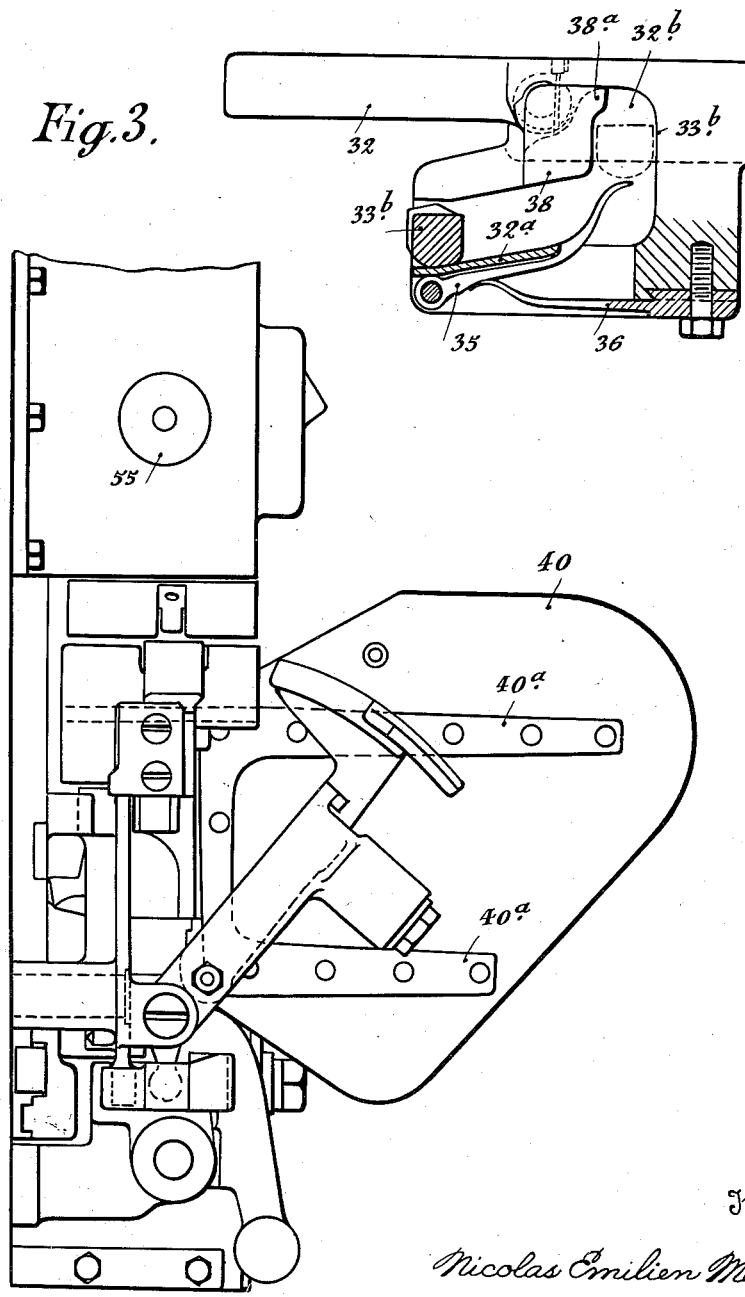
Figure 3 is a partial elevation corresponding to Figure 1.

The primer extracting mechanism is similarly constituted. This mechanism is shown in detail in Figures 7 to 11 inclusive. A disc with two profiles (6—7) acts upon a corresponding frame with two profiles carried by a rod in two parts 31—32. On the forward movement, the nose $6^a$ of the profile 6 acts upon the boss $a^6$ carried by one of the arms of the frame. The extractor 33 first of all bears on the rear face of the breech block by a flange $33^a$ for the primer loosening movement, and then bears on the pivot pin 37, on which it is mounted by means of a slot. The rod 32—31, by means of its inclined plane $32^a$, will have pushed the tail $33^b$ of the extractor. As soon as the extractor tail $33^b$ leaves the inclined plane $32^a$, and since a pawl 38 (Figures 8 and 8a) prevents it from making a forward movement, it compresses the spring 35 and the counter-spring 36 which will drive the tail $33^b$ into the recess $32^b$ as soon as the said extractor tail has left the said pawl. The extractor bears on the pivot 37 and the primer is forcibly extracted during the entering movement of the tail $33^b$ into recess $32^b$ (Figure 11). As shown in Figure 4, the extracted primer is expelled into a box 40 carried by the conveyor device 44, to which the said box is fixed by arms $40^a$ (Figures 3 and 12) and with which it pivots about the pin 49 (Figure 1a).

At the moment at which the primer is ejected, the box 40 (Figures 4 and 4a) presents, opposite the lodgment in which the primar was engaged, an inlet orifice which can be closed by two flaps $40^b$, hinged to the longitudinal walls of the said box. The ejected primer moves the said flaps inwardly, and these flaps, being returned to their original position by their return spring, form screens for preventing any unwanted escape of the primers by rebound or during the movements of the member 44.

During the movement of rotation of the shaft 12, the rod 31 is returned to its initial position by the action of the profile $a^7$ on the profile $7^a$ of the frame of the said rod.

During this return movement the spring pawl 38 is retracted by bearing on the extractor tail, and at the same time the extractor is driven by the projection $38^a$ and returns into its initial position at the entrance to the inclined plane $32^a$ (Figure 8).

According to the present invention, a device is provided for the extraction of primers by hand. This mechanism comprises a lever 34, which is locked by a spring bolt 39 during the operation of the automatic extraction device.

The spring bolt by locking the lever 34 ensures at the same time the locking of the pin 37 about which the extractor 33 rotates for automatic operation.

The manual operating lever comprises a fork, the arms of which in the form of discs $34^a$ are keyed eccentrically on the pin 37. In manual operation, this pin, which due to the retraction of the bolt 39 is no longer locked, is guided in two horizontal grooves $59^a$ carried by a support 59 integral with the movable head or "mushroom" of the breech block (Figures 3, 4, 10a and 11a).

Furthermore, the discs $34^a$ are guided vertically in slides $59^b$ provided in the same support. In the movement for raising the lever 34, for manual operation, the pin 37 first of all makes an idle movement in the slot $33^c$ (Figure 10a) of the extractor 33, then it drives the extractor 33 by the end of the said slot (Figure 11a).

During this movement the extractor bears on the inclined plane $32^a$ by its tail $33^b$.

The device also comprises a combined mechanism for conveying and inserting the primer. This mechanism comprises, on the rear end of a rod 42, a frame with two profiles $8^a$ and $9^a$ co-operating with the profiles $a^8$ and $a^9$ of discs 8 and 9. The rod carrying the frame is made in two parts connected together by a resilient connection 43 actuating the primer conveying member 44.

When the extractor has returned into its initial position, the disc 8 displaces by its nose $8^a$ the frame and the rod 42, thus causing the primer conveying member 44 to turn about its pivot 49, the primer being thus brought opposite its lodgment. By its face $8^b$, the disc 8 maintains the member 44 in its position for permitting the primer inserting movement and the return of the push rod which, as will be seen presently, has produced this insertion. Then the nose $9^a$ of the disc 9, bearing on the projection $a^9$ of the frame, returns the latter and the rod 42 into their initial position, the profile $9^b$ of the disc maintaining the frame in that position. Due to the resilient connection 43, the conveyor member 44 is always given the same extreme positions.

The primer inserting mechanism also comprises a frame on the end of a push rod 45, the arms of which frame have profiles co-operating with those of the two discs 10 and 11, so as to produce alternately the forward and return movements of the frame-carrying rod and to maintain the frame in the extreme positions. 46 shows the primer pusher whose support 47 is operated by the rod 45. 48 is a resilient abutment for the pusher 46.

As shown in Figures 12 and 13, the primer conveying device 44, which rotates about the pivot 49, carries in its upper part two pivoted jaws 50 between which the primer is positioned, a spring 51 ensuring a slight clamping of the jaws on the said primer. The primer is held guided between the jaws until the moment at which the pusher 46 opens the latter, that is to say, for about two-thirds of the distance the primer is driven home. The primer conveying member comprises in its upper portions a boss 44ᵃ permanently in contact with the next primer, that is to say, the lowermost primer of the magazine which will take the place of the primer held by the jaws after this latter primer has been inserted. The pusher 46 is pivoted at 46ᵃ to plates 44ᵇ forming bearings.

The pusher 46 first of all follows the movement of translation of the member 44, the two actuating frames moving together in the first part of the movement. It is then pushed by the rod 45 carrying a groove obliging it to rock for driving in the primer. Like the members of the mechanisms previously described, the primer inserting mechanism is returned into its initial position by the combined device of frames and discs with two profiles. The primer conveying member, as was seen in the foregoing, is returned into its initial position below the loader, while the firing bolt has been lowered into its firing position by the corresponding mechanism.

As shown by Figure 4, there is provided according to the invention a spring bolt 58 mounted in a recess in the movable head, and ensuring automatically merely by bearing friction the retention of the primer as soon as the latter has been inserted into its lodgment, a nose 58ᵃ on the said bolt bearing for this purpose on the rim of the primer.

What is claimed is:—

1. In a remote controlled device for inserting and extracting the primers of large bore guns of the type including as elements a firing bolt, a primer extractor, a primer carrier and a primer inserting pusher member, means for actuating said elements in proper sequence to effect the loading and extraction of primers comprising a plurality of means each operatively connected with one of said elements and adapted when moved in one direction to cause its associated element to perform its intended function and when moved in the opposite direction to return said element to its normal at rest position, an actuating rod connected to each of said means, a driving cam associated with each of said rods, each of said cams having a pair of profiles cooperating with a corresponding pair of follower members carried by the associated actuating rod, a common shaft on which all of said cams are mounted, and transmission means for rotating said shaft from a remote controlling point, said cam profiles and follower members being so constructed and arranged that rotation of said shaft in one direction positively moves said rods in both directions and in proper sequence to effect the primer extracting and inserting operations.

2. In a remote controlled device for inserting and extracting the primers of large bore guns of the type including as elements a firing bolt, a primer extractor, a primer carrier and a primer inserting pusher member, means for actuating said elements in proper sequence to effect the loading and extraction of primers comprising a plurality of means each operatively connected with one of said elements and adapted when moved in one direction to cause its associated element to perform its intended function and when moved in the opposite direction to return said element to its normal at rest position, an actuating rod connected to each of said means, a driving cam associated with each of said rods, each of said cams having a pair of profiles cooperating with a corresponding pair of follower members carried by the associated actuating rod, a common shaft on which all of said cams are mounted, and transmission means for rotating said shaft from a remote controlling point, said cam profiles and follower members being so constructed and arranged that rotation of said shaft in one direction positively moves said rods in one direction by cooperation between one set of profiles and follower members and in the opposite direction by cooperation between the other set, and in proper sequence to effect the primer extracting and inserting operations.

3. In a remote controlled device for inserting and extracting primers in and from the breech blocks of large bore guns, a primer extractor mounted for pivotal movement about a pivot pin passing through said extractor at a point intermediate its ends, one end of said extractor being adapted to engage the primer, means operatively connected to said extractor for moving it about said pivot pin when said means are actuated from the remote controlling position, a member connected to said pivot pin and adapted to operate said extractor independently of said remotely actuatable means, said member being actuatable from a point closely adjacent the gun, and means normally locking said member and pivot pin in a fixed position relative to the breech block and thereby providing a fixed fulcrum for said extractor during actuation from said remote controlling position.

4. In a remote controlled device for inserting and extracting primers in and from the breech blocks of large bore guns, a primer extractor mounted for pivotal movement about a pivot pin passing through said extractor at a point intermediate its ends, one end of said extractor being adapted to engage the primer, means operatively connected to the other end of said extractor for moving it about said pivot pin when said means are actuated from the remote controlling position, a member connected to said pivot pin for moving said extractor about its last mentioned end as a fulcrum to extract the primer independently of said remotely actuatable means, said member being actuatable from a point closely adjacent the gun, and means normally locking said member and pivot pin in a fixed position relative to the breech block and thereby providing a fixed fulcrum for said extractor during actuation from said remote controlling position.

5. In a remote controlled device for inserting and extracting primers in and from the breech blocks of large bore guns, a primer extractor mounted for pivotal movement about a pivot pin passing through said extractor at a point intermediate its ends, the upper end of said extractor being adapted to engage the primer, means operatively connected to the lower end of said extractor for moving it about said pivot pin when said means are actuated from the remote controlling position, a member mounted on said pivot pin and carrying a cam formed eccentrically with said pin, said cam being so arranged that movement of said member about said pin as an axis brings the cam into engagement with a surface fixed with respect to the breech block of the gun, moves said pin outwardly from the breech block and thereby moves said extractor about its lower end as a fulcrum to extract the primer independently of said remotely actuatable means, said member being actuatable from a point closely adjacent the gun, and means normally locking said member in a fixed position relative to the breech block and thereby constituting said pin a fixed fulcrum for said extractor during actuation from said remote controlling position.

6. In a remote controlled device for inserting and extracting primers in and from the breech blocks of large bore guns, a primer extractor mounted for pivotal movement about a pivot pin passing through said extractor at a point intermediate its ends, the upper end of said extractor being adapted to engage the primer, means operatively connected to the lower end of said extractor for moving it about said pivot pin when said means are actuated from the remote controlling position, a manually actuatable lever fixed on said pivot pin and carrying a cam formed eccentrically with said pin, said cam being so arranged that movement of said lever about said pin as a fulcrum brings the cam into engagement with a surface fixed with respect to the breech block of the gun, moves said pin outwardly from the breech block and thereby moves said extractor about its lower end as a fulcrum to extract the primer independently of said remotely actuatable means, said lever being actuatable from a point closely adjacent the gun, and means normally locking said lever in a fixed position relative to the breech block and thereby constituting said pin a fixed fulcrum for said extractor during actuation from said remote controlling position.

7. In a remote controlled device for inserting and extracting primers in and from the breech blocks of large bore guns, a primer extractor mounted for pivotal movement about a pivot pin passing through said extractor at a point intermediate its ends, the upper end of said extractor being adapted to engage the primer, means operatively connected to the lower end of said extractor for moving it about said pivot pin when said means are actuated from the remote controlling position, a manually actuatable lever having a forked end, the arms of said fork being in the form of cam discs secured to said pivot pin eccentrically with respect thereto, said cam discs being so arranged that movement of said lever about said pin as a fulcrum brings the discs into engagement with a surface fixed with respect to the breech block of the gun, moves said pin outwardly from the breech block and thereby moves said extractor about its lower end as a fulcrum to extract the primer independently of said remotely actuatable means, said lever being actuatable from a point closely adjacent the gun, and means normally locking said lever in a fixed position relative to the breech block and thereby constituting said pin a fixed fulcrum for said extractor during actuation from said remote controlling position.

8. In a device for inserting and extracting primers in and from the primer duct of a gun, an extractor, a magazine for unfired primers, a primer carrier adapted to convey primers from said magazine to a loading position in line with the primer duct, said carrier normally being positioned adjacent the magazine and out of line with said duct, and means for catching and retaining primers removed from said duct by said extractor, said means normally being positioned in line with and adjacent said duct but movable out of said position to permit movement of said carrier to primer loading position.

9. In a device for inserting and extracting primers in and from the primer duct of a gun, an extractor, a magazine for unfired primers, a primer carrier adapted to convey primers from said magazine to a loading position in line with the primer duct, said carrier normally being positioned adjacent the magazine and out of line with said duct, and a container movable with said carrier for catching and retaining primers removed from said duct by said extractor, said container normally being positioned in line with and adjacent said duct but movable out of said position upon movement of said carrier to primer loading position.

10. In a device for inserting and extracting primers in and from the primer duct of a gun, an extractor, a magazine for unfired primers, a primer carrier adapted to convey primers from said magazine to a loading position in line with the primer duct, said carrier normally being positioned adjacent the magazine and out of line with said duct, a container for catching primers removed from said duct by said extractor, and means associated with said container permitting free entrance thereinto of the extracted primers but preventing their escape therefrom, said container normally being positioned in line with and adjacent said duct but movable out of said position upon movement of said carrier to primer loading position.

11. In a device for inserting and extracting primers in and from the primer duct of a gun, an extractor, a magazine for unfired primers, a primer carrier adapted to convey primers from said magazine to a loading position in line with the primer duct, said carrier normally being positioned adjacent the magazine and out of line with said duct, a container movable with said carrier and having an opening for catching primers removed from said duct by said extractor, inwardly opening flap means for said container opening, and means yieldably urging said flap means to closed position, whereby the extracted primers are permitted free entrance into said container but are prevented from escaping therefrom through said opening, said container normally being positioned with its opening in line with and adjacent said primer duct but movable out of said position upon movement of said carrier to primer loading position.

NICOLAS EMILIEN METHLIN.